United States Patent
Kalb et al.

(10) Patent No.: US 10,823,235 B2
(45) Date of Patent: Nov. 3, 2020

(54) ANTI-BACKLASH CLUTCH PLATES

(71) Applicant: Norgren Automation Solutions, LLC, Saline, MI (US)

(72) Inventors: James R. Kalb, Petersburg, MI (US); Edwin E. Marttinen, Pinckney, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 559 days.

(21) Appl. No.: 15/371,884

(22) Filed: Dec. 7, 2016

(65) Prior Publication Data
US 2017/0159721 A1  Jun. 8, 2017

Related U.S. Application Data

(60) Provisional application No. 62/263,933, filed on Dec. 7, 2015.

(51) Int. Cl.
*F16D 13/64* (2006.01)
*F16D 13/68* (2006.01)
*F16D 13/52* (2006.01)

(52) U.S. Cl.
CPC .......... *F16D 13/683* (2013.01); *F16D 13/52* (2013.01); *F16D 13/64* (2013.01); *F16D 13/648* (2013.01)

(58) Field of Classification Search
CPC .................................................. F16D 13/683
USPC ........................................................ 192/70.2
See application file for complete search history.

(56) References Cited

U.S. PATENT DOCUMENTS

| | | | |
|---|---|---|---|
| 2,396,139 A | | 3/1946 | Walter |
| 2,738,864 A | * | 3/1956 | Becker .................... F16D 13/52 |
| | | | 192/107 C |
| 3,117,432 A | * | 1/1964 | Schleicher .............. F16D 13/68 |
| | | | 464/139 |
| 5,820,287 A | | 10/1998 | Bartlett et al. |
| 5,971,652 A | | 10/1999 | Bartlett et al. |
| 7,451,668 B2 | | 11/2008 | Hasegawa et al. |
| 8,641,575 B2 | * | 2/2014 | Kokubo ................ F16D 13/683 |
| | | | 475/249 |
| 2002/0112935 A1 | | 8/2002 | Helmstadter et al. |

(Continued)

FOREIGN PATENT DOCUMENTS

| | | | | |
|---|---|---|---|---|
| DE | 2006029163 | * | 12/2007 | ............. F16D 13/69 |
| DE | 10 2010 004295 A1 | | 7/2010 | |

(Continued)

OTHER PUBLICATIONS

International Search Report dated Mar. 24, 2017.

*Primary Examiner* — Charles A Fox
*Assistant Examiner* — Ryan P Dodd
(74) *Attorney, Agent, or Firm* — Young Basile Hanlon & MacFarlane, P.C.

(57) ABSTRACT

An assembly comprising a first member, a second member, and a clutch plate. The second member is maintained in a spaced apart relationship from the first member. The clutch plate has radially extending engagement structures and is disposed between the first member and the second member. The clutch plate has a first half and a second half that are slidably rotatable with respect to one another. The first half and the second half of the clutch plate rotate in opposite directions when axial pressure is applied to the first member.

20 Claims, 11 Drawing Sheets

(56) References Cited

U.S. PATENT DOCUMENTS

2007/0089961 A1* 4/2007 Ruprecht ............... F16D 13/04
192/70.2

FOREIGN PATENT DOCUMENTS

EP 0 982 511 A1 3/2000
WO 2007/000131 A2 1/2007

* cited by examiner

ANTI-BACKLASH CLUTCH PLATES

CROSS-REFERENCE TO RELATED APPLICATION

This application claims the benefit of U.S. Provisional Patent Application Ser. No. 62/263,933, filed on Dec. 7, 2015, which is incorporated in its entirety by reference.

TECHNICAL FIELD

This application relates to clutch plates, and more particularly, to anti-backlash clutch plates that minimize backlash created by the rotation and engagement of the clutch plates within a housing.

BACKGROUND

When excessive torque is applied to mechanical components, the mechanical components may crash or jam, which can cause significant damage to the mechanical components and/or any workpieces the mechanical components are manipulating. Because of this, torque limiters are often used to protect the mechanical components and the workpieces. The torque limiter may be applied to two mechanical components that are rotatably attached and connected by the torque limiter. The torque limiter can then limit the torque applied to the two mechanical components by slipping, as in a friction plate slip clutch, or uncoupling the load entirely, as in a shear pin application.

When clutch plates are used as torque limiters or used in other clutch applications, the clutch plates may have radially extending teeth that engage corresponding grooves in a housing of the mechanical components. To prohibit backlash created by the rotation of the clutch plates relative to the mechanical components, the teeth of the clutch plates and the grooves of the housing of the mechanical component are manufactured to a fine tolerance so as to eliminate or minimize the spacing between the mating teeth of the clutch plates and the grooves of the housing. Because there are typically numerous clutch plates utilized in such torque limiters, the cost of manufacturing these components to fine tolerances can be cost prohibitive.

SUMMARY

Clutch plates that minimize the backlash created by rotation of the clutch plates are disclosed. In one embodiment, an assembly includes a first biasing member, a second biasing member maintained in a fixed spaced apart relationship from the first biasing member, and a clutch plate. The clutch plate has radially extending engagement structures and is disposed between the first biasing member and the second biasing member. The clutch plate has a first half and a second half that are slidably rotatable to one another. The first half and the second half of the clutch plate rotate in opposite directions to widen a width of each radially extending engagement structure when axial pressure is applied to the first member.

The assembly can include a housing having a substantially cylindrical wall with grooves formed therein. The radially extending engagement structures of the clutch plate can be disposed within the grooves of the substantially cylindrical wall. The width of each radially extending engagement structure of the clutch plate when no axial pressure is applied is less than a width of the respective groove in the substantially cylindrical wall that the radially extending engagement structure is disposed in. The assembly can include a housing having a shaft with grooves formed thereon. The radially extending engagement structures of the clutch plate can be disposed within the grooves of the shaft. The width of each radially extending engagement structure of the clutch plate when no axial pressure is applied is less than a width of the respective groove in the shaft that the radially extending engagement structure is disposed in.

The first half and the second half of the clutch plate can have inclined surfaces that extend substantially perpendicular to the radially extending engagement structures. The inclined surfaces of the first half and the second half of the clutch plate can each have a substantially triangular cross-sectional configuration. Two legs of the substantially triangular cross-sectional configuration of each inclined surface can form a right angle with an opposing hypotenuse. The inclined surfaces of the first half of the clutch plate can be aligned so that the right angle of each inclined surface is on a first side of each respective inclined surface. The inclined surfaces of the second half of the clutch plate can be aligned so that the right angle of each inclined surface is on a second side of each respective inclined surface. The hypotenuse of each inclined surface of the first half of the clutch plate can engage the hypotenuse of a respective inclined surface of the second half of the clutch plate. The inclined surfaces of the first half of the clutch plate and the second half of the clutch plate can be substantially similar. The inclined surfaces of the first half of the clutch plate can have a positive slope and the inclined surfaces of the second half of the clutch plate can have a negative slope.

The clutch plate can have a substantially disc-like configuration with a substantially cylindrical aperture extending in an axial direction. The thickness of the clutch plate can be measured in the axial direction. The thickness of the clutch plate can decrease as axial pressure applied to the first member increases until the thickness of the clutch plate reaches a minimum thickness.

The assembly can include a housing and a second clutch plate. The housing can have a substantially cylindrical wall with grooves formed therein and a shaft with grooves formed therein. The second clutch plate can have radially extending engagement structures and be disposed between the first member and the second member. The second clutch plate can have a first half and a second half that are slidably rotatable with respect to one another. The first half and the second half of the second clutch plate rotate in opposite directions to widen a width of each radially extending engagement structure when axial pressure is applied to the first member. The radially extending engagement structures of the clutch plate can be disposed with the grooves of the substantially cylindrical wall. The radially extending engagement structures of the second clutch plate can be disposed within the grooves of the shaft.

The second member can be an end plate connected to the substantially cylindrical wall. The first halves and the second halves of the clutch plate and the second clutch plate can have inclined surfaces that extend substantially perpendicular to the respective radially extending engagement structures. The inclined surfaces of the first halves and the second halves of the clutch plate and the second clutch plate can each have a substantially triangular cross-sectional configuration. Two legs of the substantially triangular cross-sectional configuration of each inclined surface can form a right angle with an opposing hypotenuse.

The inclined surfaces of the first half of the clutch plate can be aligned so that the right angle of each inclined surface is on a first side of each respective inclined surface. The inclined surfaces of the second half of the clutch plate can be aligned so that the right angle of each inclined surface is on a second side of each respective inclined surface. The hypotenuse of each inclined surface of the first half of the clutch plate can engage the hypotenuse of a respective inclined surface of the second half of the clutch plate. The inclined surfaces of the first half of the second clutch plate can be aligned so that the right angle of each inclined surface is on a first side of each respective inclined surface. The inclined surfaces of the second half of the second clutch plate can be aligned so that the right angle of each inclined surface is on a second side of each respective inclined surface. The hypotenuse of each inclined surface of the first half of the second clutch plate engage the hypotenuse of a respective inclined surface of the second half of the second clutch plate.

One of either the inclined surfaces of the first half of the clutch plate or the inclined surfaces of the second half of the clutch plate can have a positive slope. The other of either the inclined surfaces of the first half of the clutch plate or the inclined surfaces of the second half of the clutch plate can have a negative slope. One of either the inclined surfaces of the first half of the second clutch plate or the inclined surfaces of the second half of the second clutch plate can have a positive slope. The other of either the inclined surfaces of the first half of the second clutch plate or the inclined surfaces of the second half of the second clutch plate can have a negative slope.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

This description is directed to clutch plates 210, 212 (shown in FIGS. 1-2) that minimize or eliminate the backlash that can result as the clutch plates 210, 212 rotate. The clutch plates 210, 212 may be used in a clutch assembly, such as a clutch assembly 200 shown in FIG. 5, or a positionable joint, such as a positionable joint 300 shown in FIGS. 6-9 or a positionable joint 400 shown in FIGS. 10-13. These examples are not limiting as the clutch plates 210, 212 may be used in other assemblies, joints, or mechanical components.

Figure 5:
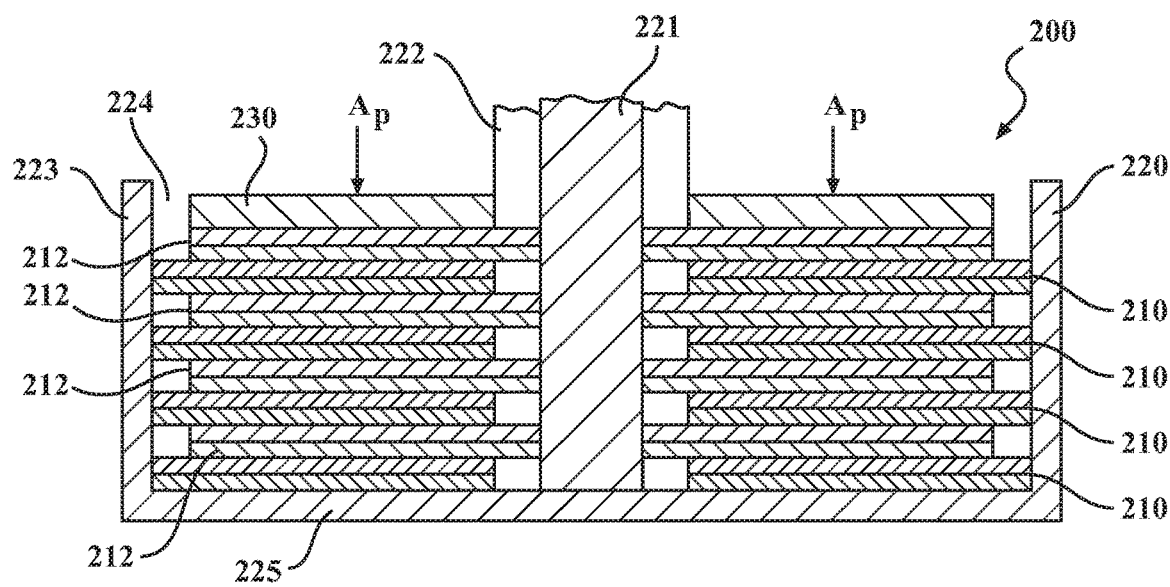
FIG. 5 is a cross-sectional view of a clutch assembly having the first and second clutch plates stacked therein.
Figure 6:
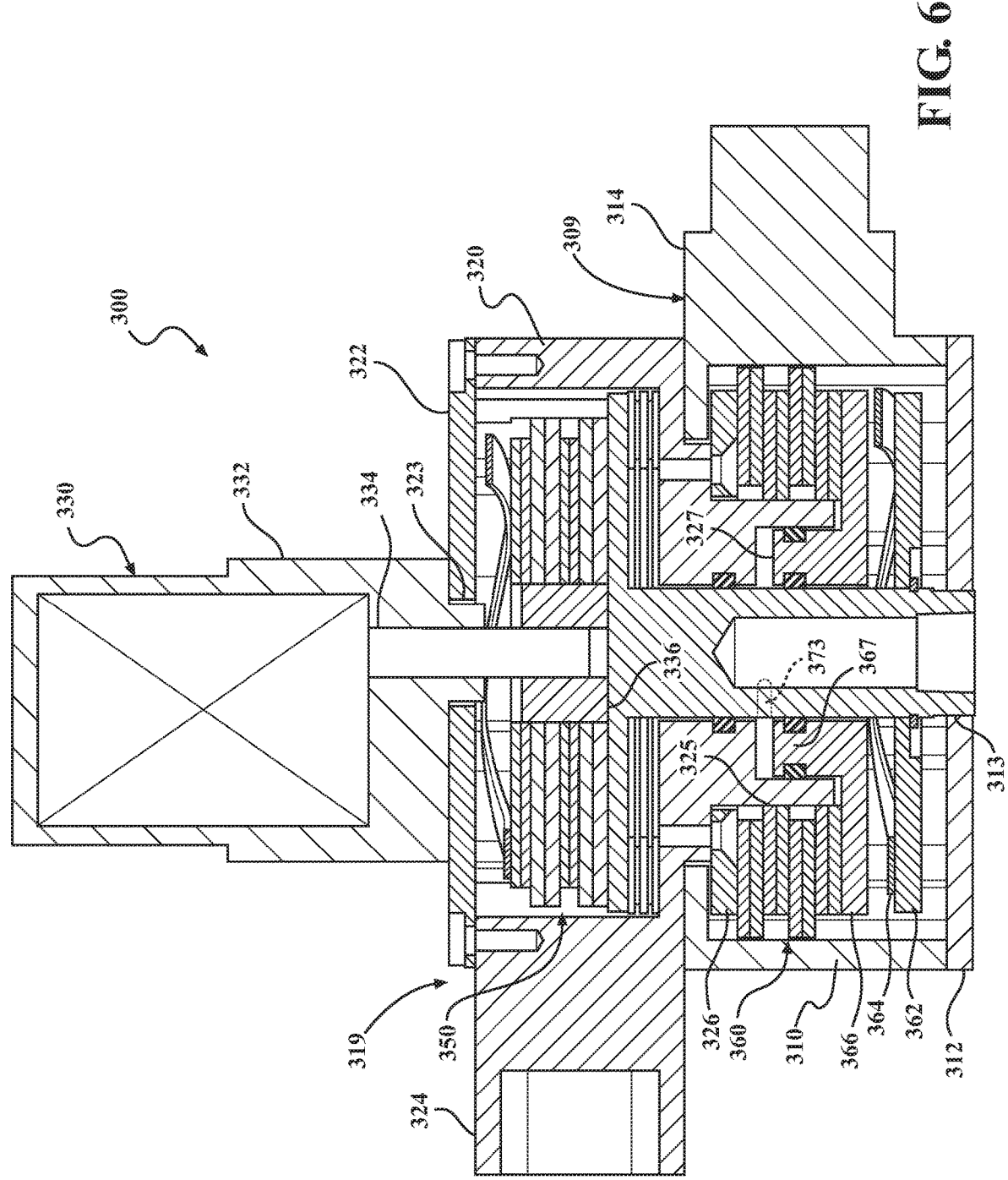
FIG. 6 is a cross-sectional view of a positionable joint having the first and second clutch plates according to a first example.
Figure 7:
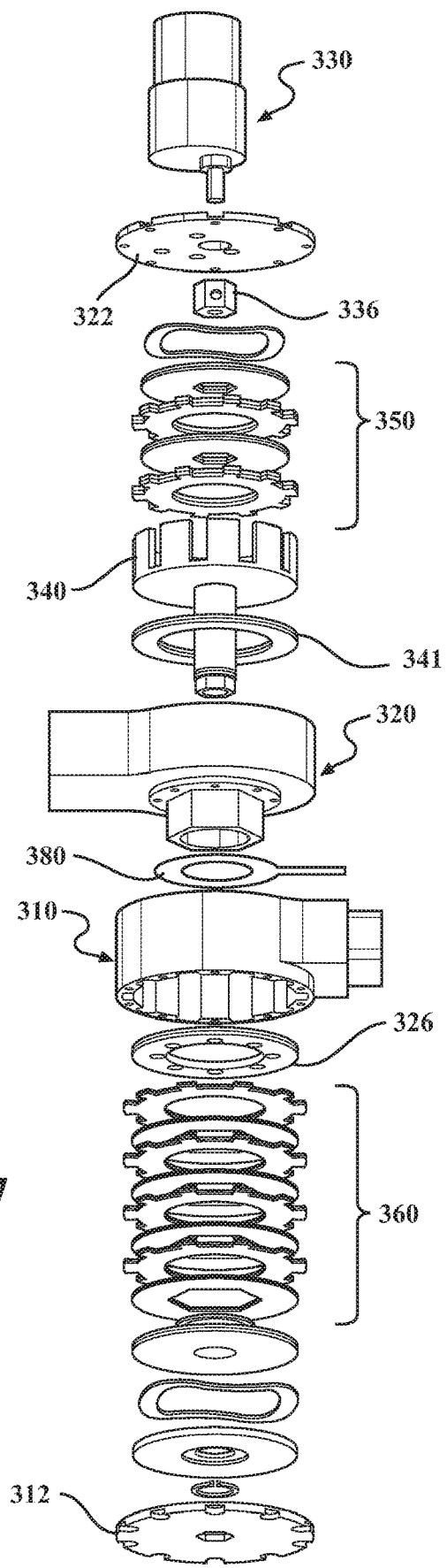
FIG. 7 is an exploded perspective view of the positionable joint of FIG. 6.
Figure 8:
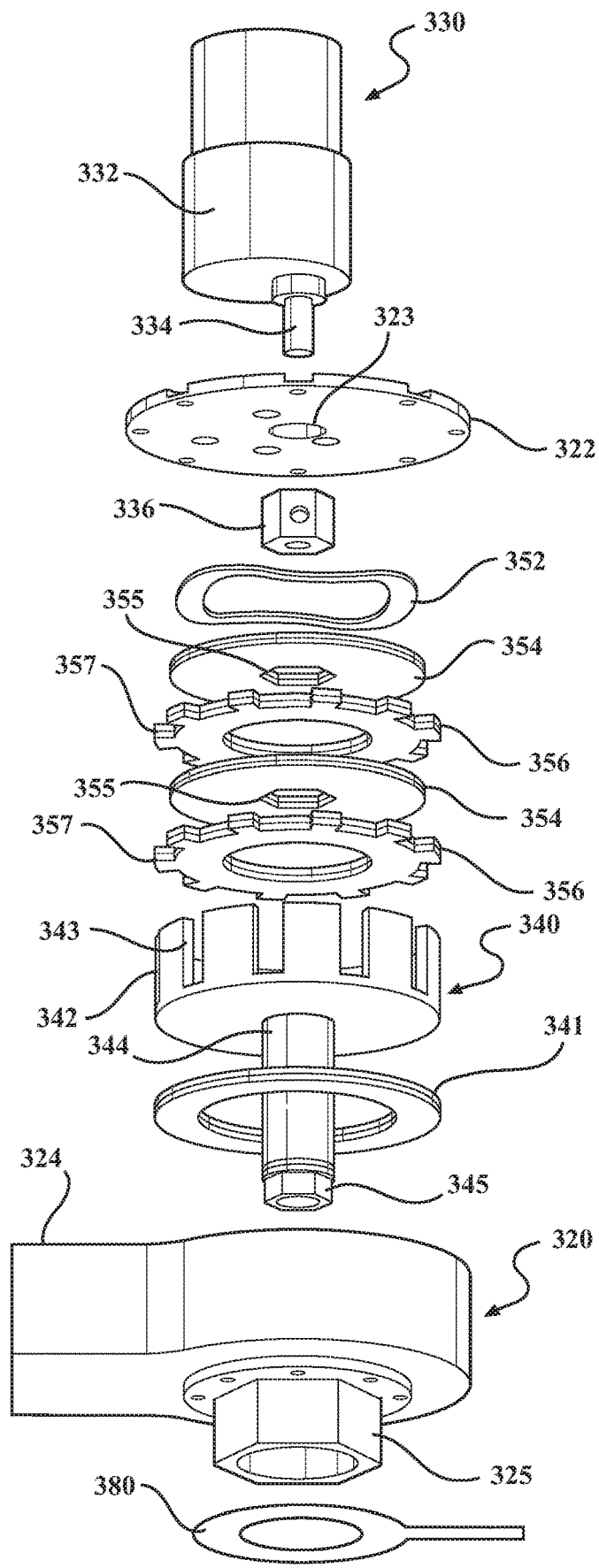
FIG. 8 is a detailed, exploded perspective view showing portions of a second housing of the positionable joint of FIG. 6.
Figure 9:
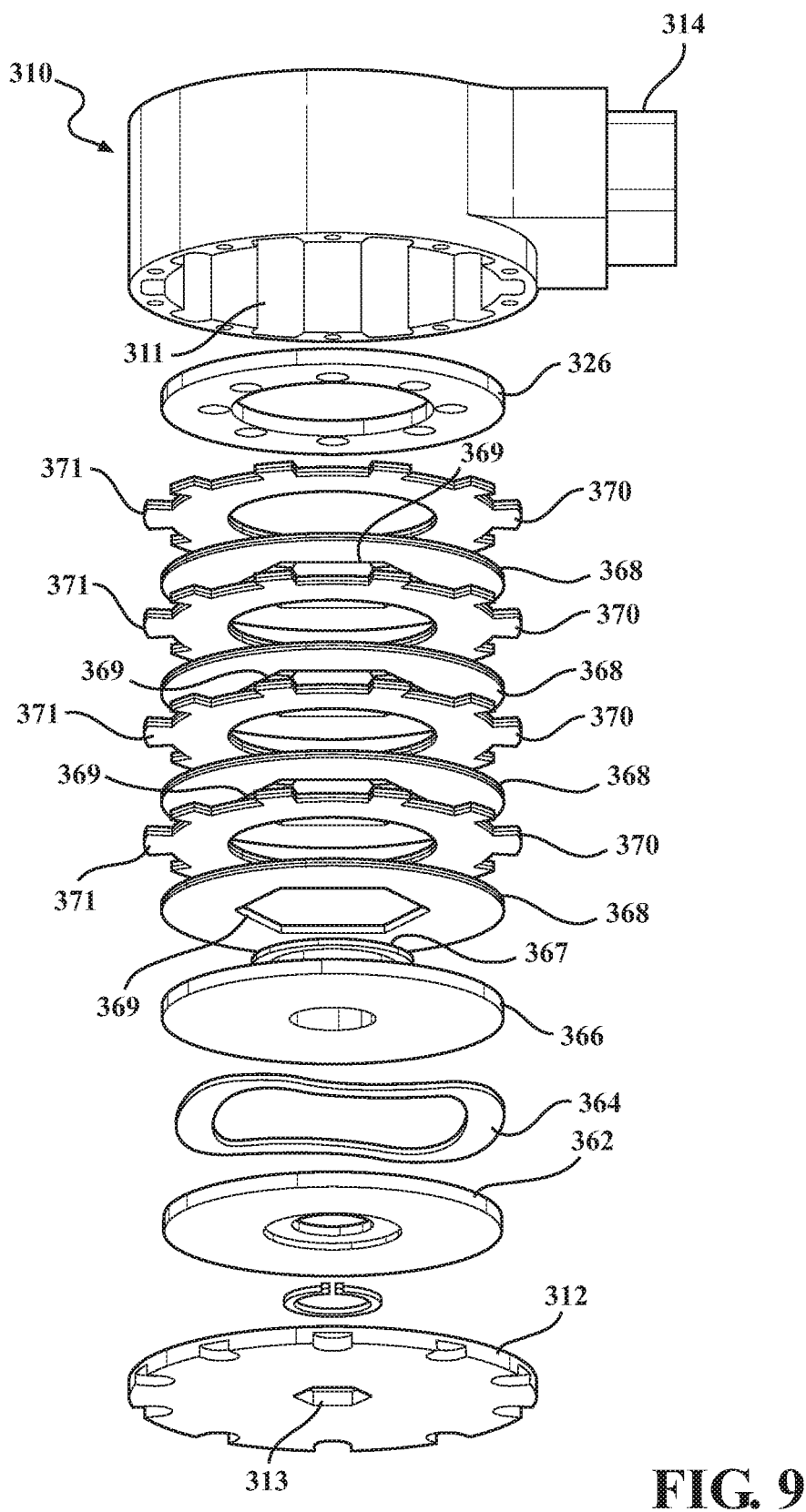
FIG. 9 is a detailed, exploded perspective view showing portions of a first housing of the positionable joint of FIG. 6.
Figure 10:
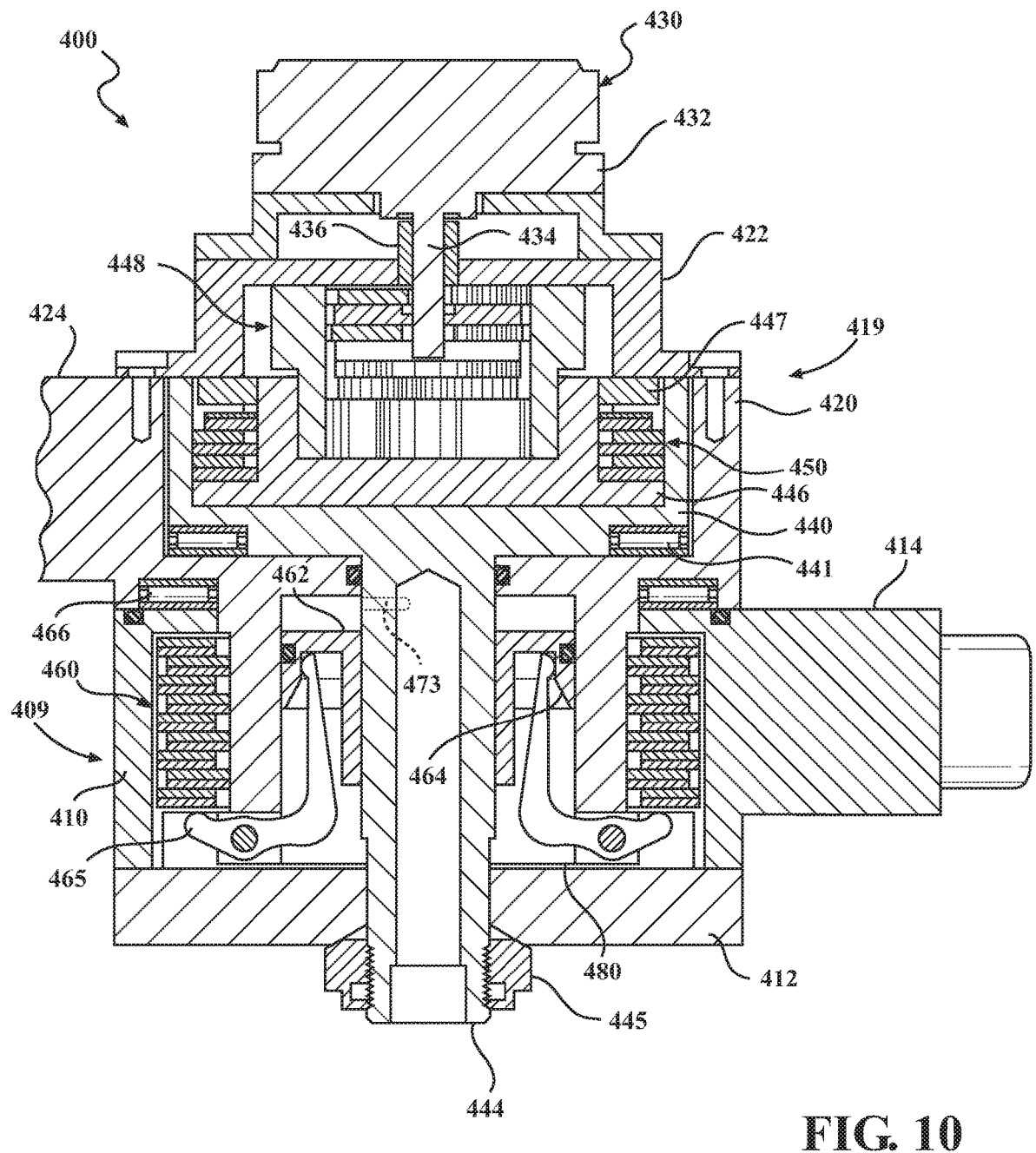
FIG. 10 is a cross-sectional view of a positionable joint having the first and second clutch plates according to a second example.
Figure 11:
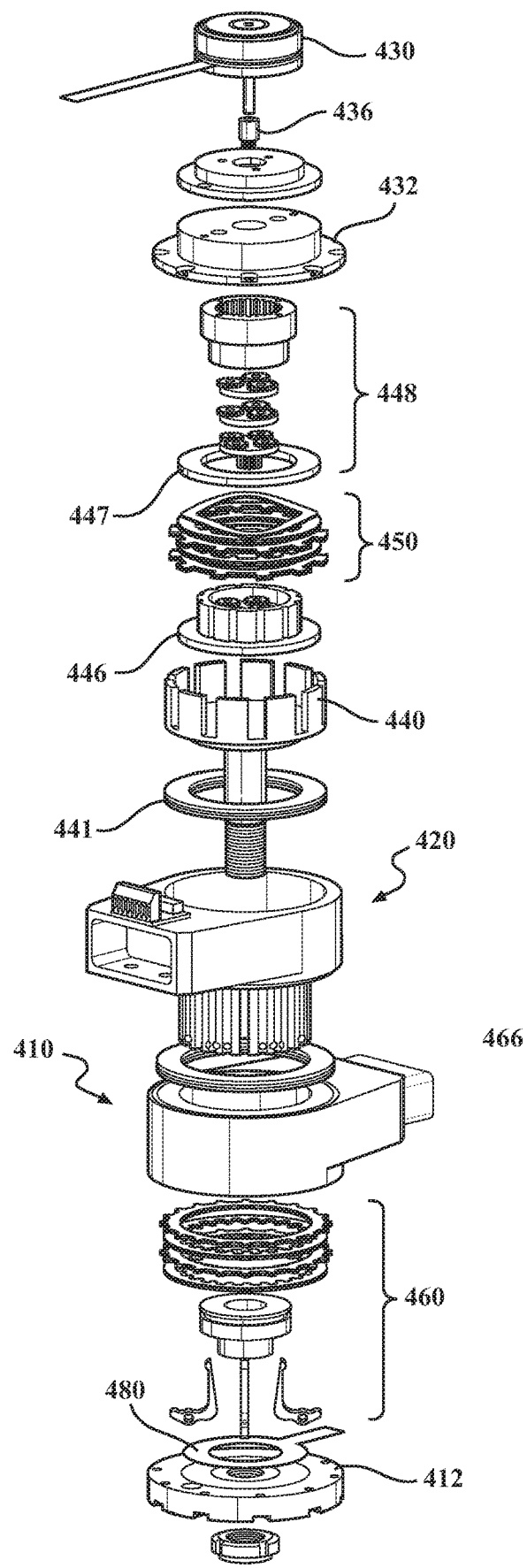
FIG. 11 is an exploded perspective view of the positionable joint of FIG. 10.
Figure 12:
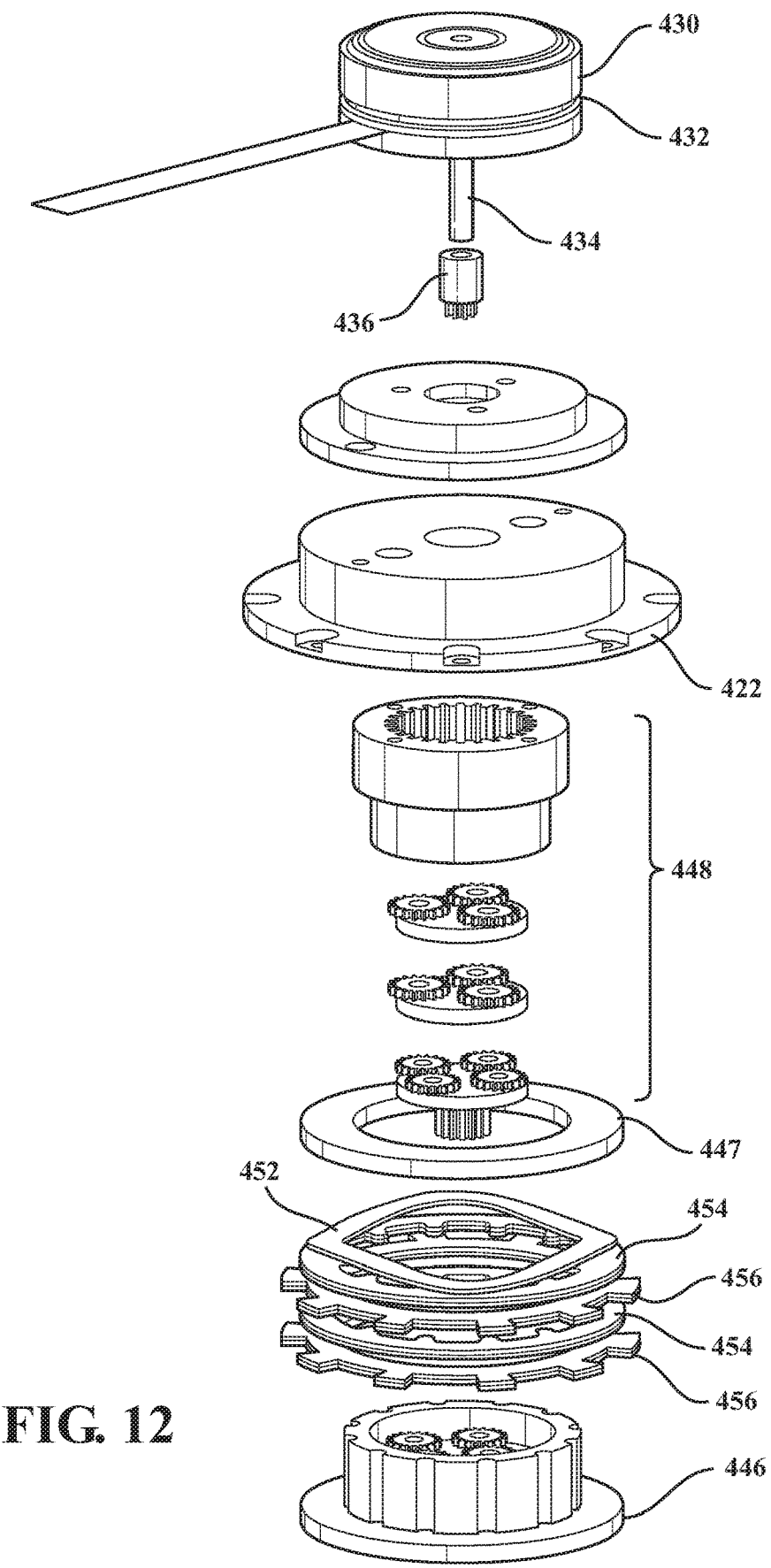
FIG. 12 is a detailed, exploded perspective view showing portions of a second housing of the positionable joint of FIG. 10.
Figure 13:
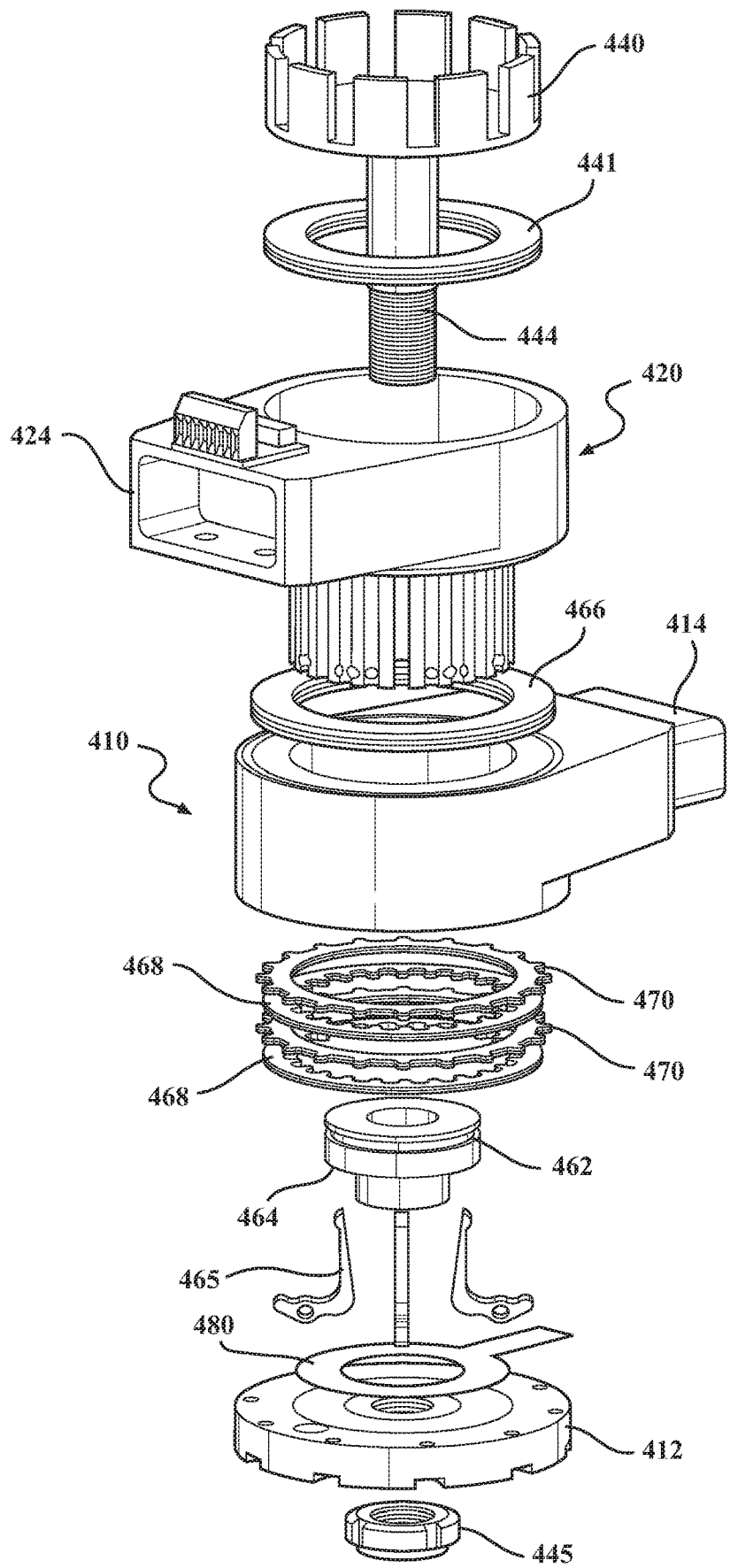
FIG. 13 is a detailed, exploded perspective view showing portions of a first housing of the positionable joint of FIG. 10.

The clutch assembly 200 illustrated in FIG. 5 includes a plurality of first clutch plates 210, a plurality of second clutch plates 212, a housing 220, and a biasing member (first member) 230. However, the clutch assembly 200 could be comprised of a single first clutch plate 210 or a single second clutch plate 212. The housing 220 may have a substantially tubular configuration with an outer cylindrical wall 223. An end plate (second member) 225 can be connected to or integrally formed with the outer cylindrical wall 223 of the housing 220. A plurality of first grooves 224 may be formed in the outer cylindrical wall 223. The plurality of first grooves 224 can extend axially from the end plate 225 to a free end of the outer cylindrical wall 223. The plurality of first grooves 224 can be substantially parallel to a central shaft 221. A plurality of second grooves 222 may be formed in the central shaft 221. The plurality of second grooves 222 can extend axially, substantially parallel to the plurality of first grooves 224.

Figure 1:
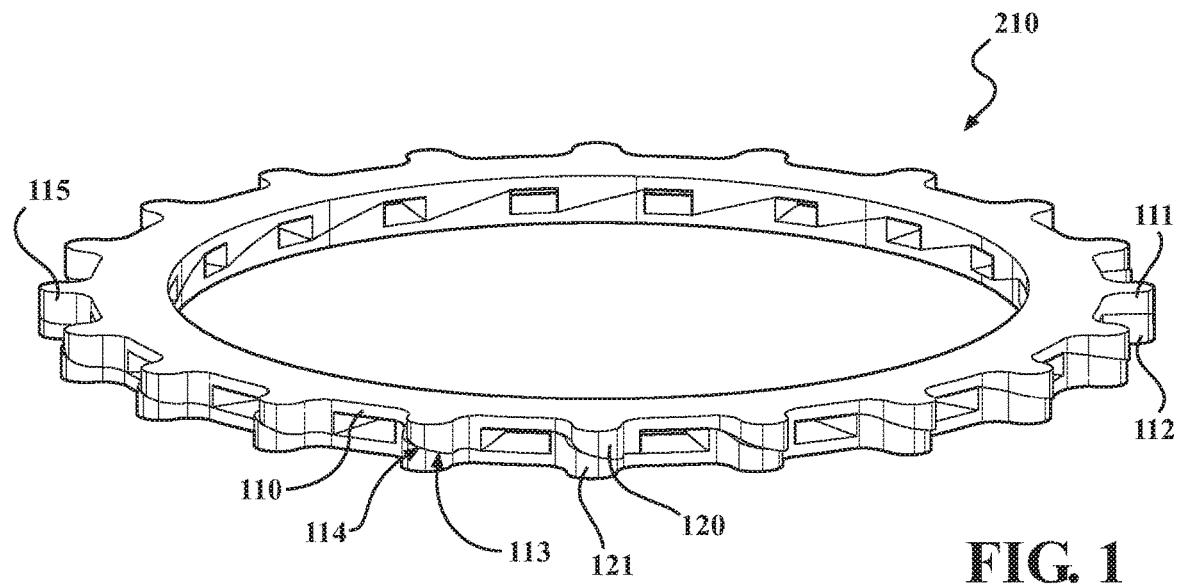
FIG. 1 is a perspective view of a first clutch plate having a first half and a second half.
Figure 2:
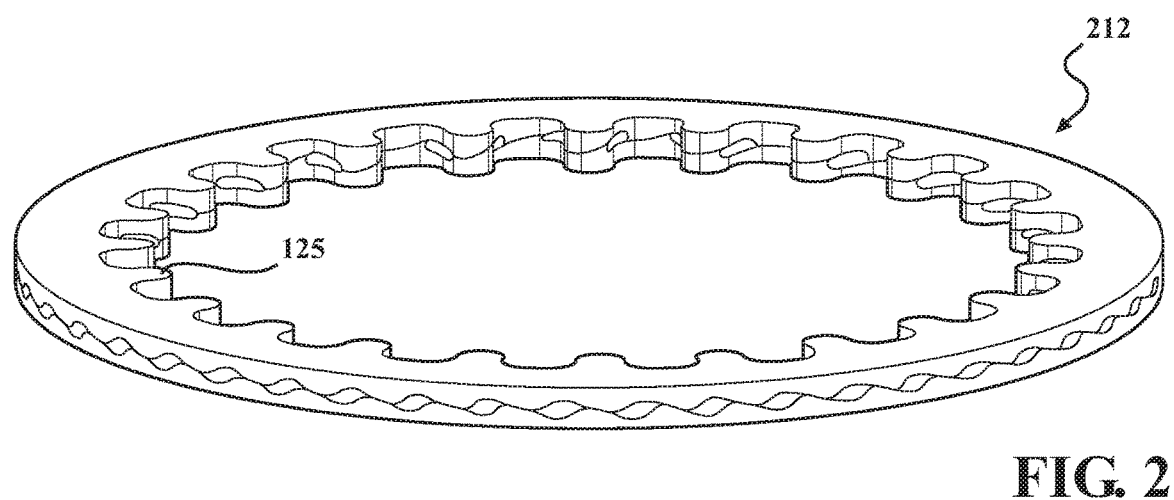
FIG. 2 is a perspective view of a second clutch plate having a first half and a second half.

As shown in FIGS. 1-2, the first and second clutch plates 210, 212 can have a substantially disc-like configuration with a substantially cylindrical aperture extending in an axial direction. The first and second clutch plates 210, 212 may have radially extending engagement structures 115, 125, such as teeth, that can engage the first grooves 224 or the second grooves 222, respectively, formed in the housing 220. In the illustrated example, the engagement structures 115 on the first clutch plates 210 extend radially outward from an outer circumference of the first clutch plate 210 to engage the first grooves 224 in the outer cylindrical wall 223 of the housing 220, and the engagement structures 125 on the second clutch plates 212 extend radially inward from an inner circumference of the second clutch plate 212 to engage the second grooves 222 on central shaft 221 of the clutch assembly 200. This allows the plurality of first clutch plates 210 to rotate in unison with the outer cylindrical wall 223 of the housing 220, and the plurality of second clutch plates 212 to rotate in unison with the central shaft 221 of the clutch assembly 200 independent of the first clutch plates 210. The engagement structures 115, 125 may each have a width that is slightly narrower than the width of the respective first or second grooves 224, 222 to allow for engagement.

The first and second clutch plates 210, 212 may be fabricated from metal or a high friction material, such as an organic material; however, other materials can be used. The first and second clutch plates 210, 212 can be alternatively stacked in an interleaved manner within the housing 220 adjacent to the end plate 225. The biasing member 230 is positioned adjacent to the opposing end of the stacked first and second clutch plates 210, 212 in order to apply axial pressure $A_p$ to the first and second clutch plates 210, 212, thereby increasing frictional engagement between the first and second clutch plates 210, 212. The axial pressure $A_p$ may be applied by a spring, clamp, fastener or other mechanical component (not shown).

In order to minimize the backlash that can result because of the size difference between the engagement structures 115, 125 and the respective first or second grooves 224, 222, the engagement structures 115, 125 on the clutch plates 210, 212 have the ability to widen when axial pressure $A_p$ is applied to the first and second clutch plates 210, 212. With the exception of the engagement structures 115, 125 extending radially outward and inward, respectively, the first and second clutch plates 210, 212 are substantially similar. Because of this, the following description of the first and second clutch plates 210, 212 will be directed to the first clutch plates 210 for the sake of brevity.

Each clutch plate 210 has a first half 111 and a second half 112 that are substantially similar and lie adjacent to one another, as shown in FIG. 1. The first half 111 and second half 112 have mating inclined portions 113, 114 formed on the engagement structures 115 and a body 110 of the clutch plate 210 that allow the first half 111 to slidably rotate with respect to the second half 112 of the clutch plate 210. The mating inclined portions 113, 114 can include a plurality of protruding ridges 120, 121 that axially extend in a direction that is substantially perpendicular to the body 110. The slope and height of each protruding ridge 120, 121 can be substantially similar.

Figure 4A:
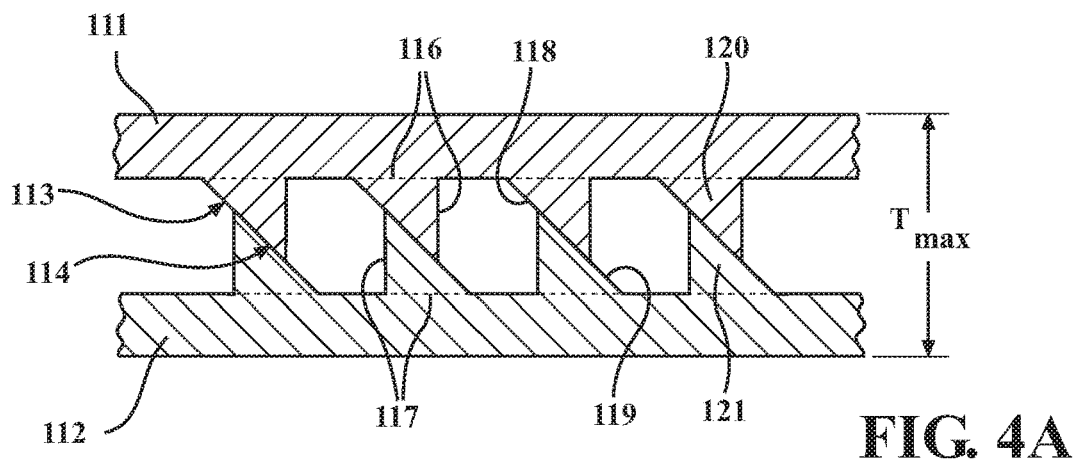
FIGS. 4A-B are schematic drawings showing the thickness of the first and second clutch plates when axial pressure is applied.
Figure 4B:
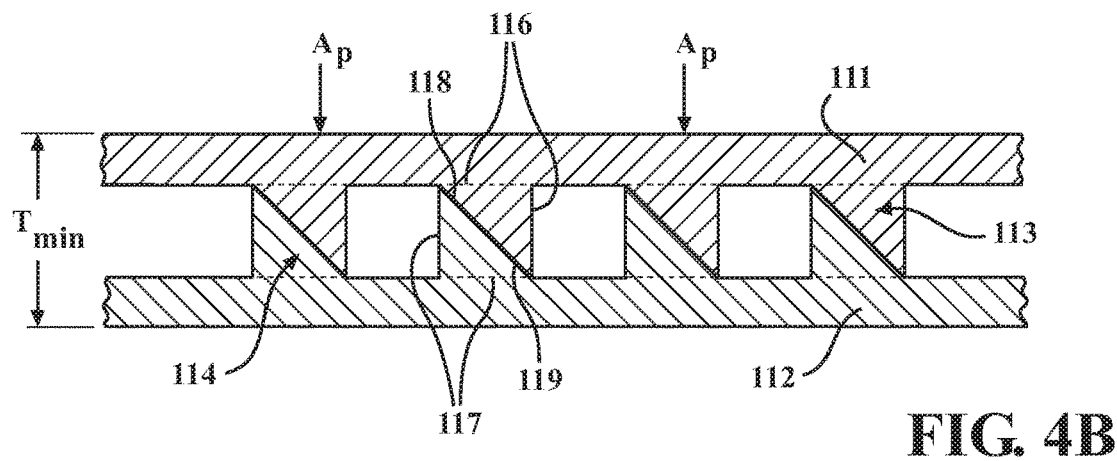

In the illustrated, non-limiting example, the mating inclined portions 113, 114 each have a substantially triangular cross-sectional configuration, as shown in FIGS. 4A-4B. Two legs 116, 117 of each mating inclined portion 113, 114 form a substantially right angle with an opposing hypotenuse 118, 119. The mating inclined portions 113 can be aligned so that the right angle of each inclined portion 113 is on a first side of each respective inclined portion 113, the right side in the illustrated example. Similarly, the mating inclined portions 114 can be aligned so that the right angle of each inclined portion 114 is on a second side of each respective inclined portion 114, the left side in the illustrated example. As a result, the hypotenuse 118 of each mating inclined portion 113 of the first half 111 of the clutch plate 210 can be in communication with or engage the hypotenuse 119 of a corresponding mating inclined portion 114 of the second half 112 of the clutch plate 210. In the illustrated example, each mating inclined portion 113 of the first half 111 of the clutch plate 210 has a negative slope and each mating inclined portion 114 of the second half 112 of the clutch plate 210 has a positive slope. The absolute value of the slopes of the mating inclined portions 113, 114 of the first and second halves 111, 112 of the clutch plate 210 can be substantially similar to one another to allow for sliding of the mating inclined portions 113, 114.

Figure 3A:
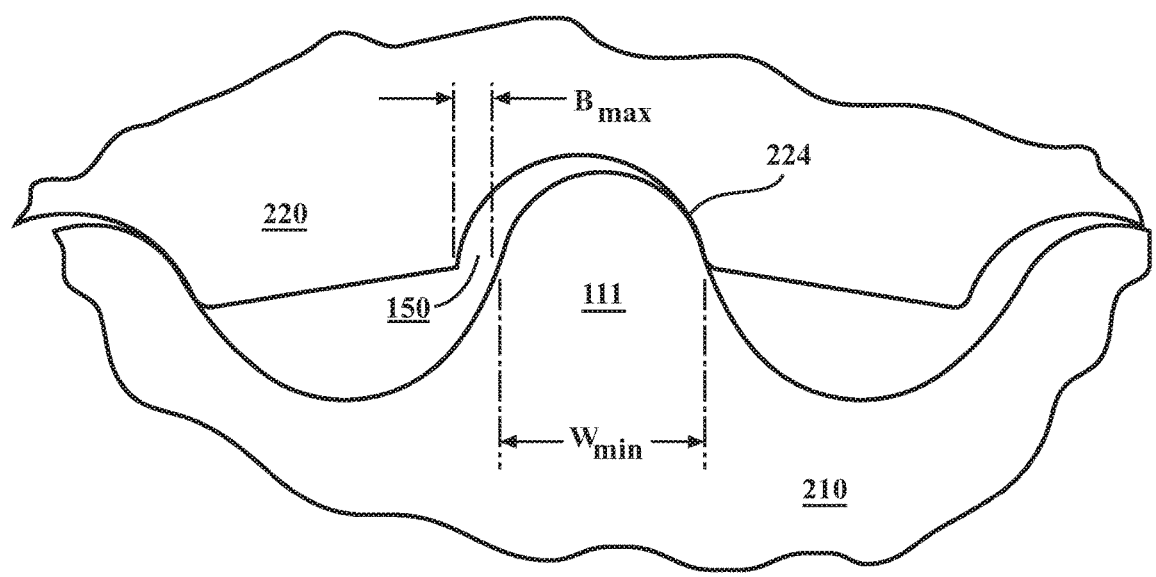
FIGS. 3A-B are schematic diagrams showing the width of the first and second clutch plates when axial pressure is applied.
Figure 3B:
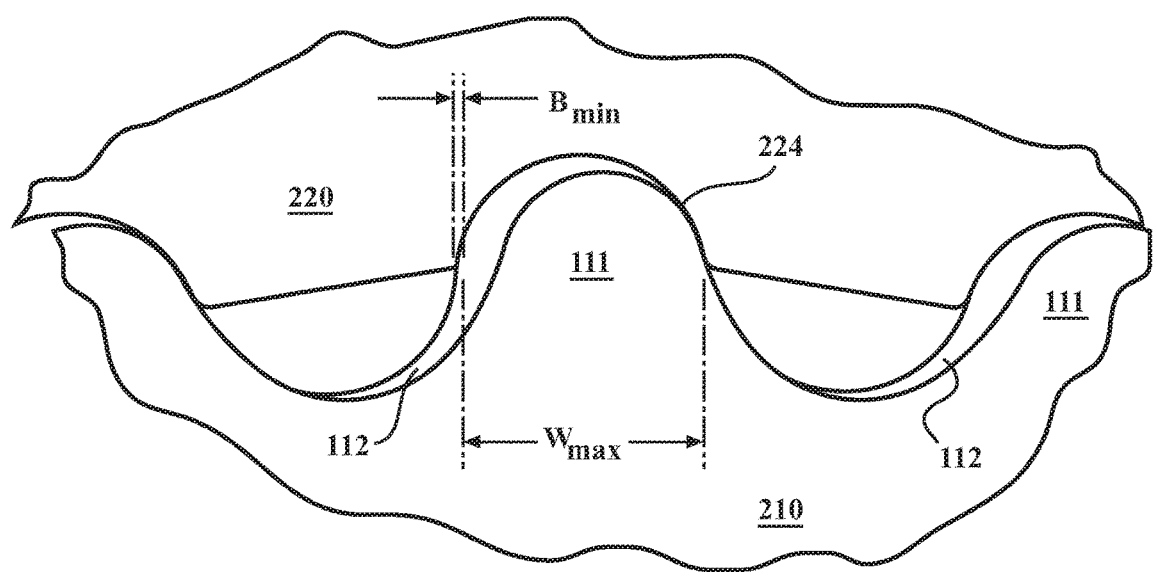

FIGS. 3A-3B and 4A-4B show the interaction of the first half 111 and the second half 112 when axial pressure $A_p$ is applied to the clutch plate 210. When little or no axial pressure $A_p$ is applied to the clutch plate 210, each engagement structure 115 may have its maximum thickness $T_{max}$ and minimum width $W_{min}$, which may occur when the first half 111 and the second half 112 of the clutch plate 210 are aligned as shown in FIG. 3A. (Because of this alignment, the second half 112 is not visible in FIG. 3A.) When the width of each engagement structure 115 is at any size other than its maximum width $W_{max}$, a gap 150 is created between the groove 224 and the engagement structure 115. This gap can create backlash when the clutch plate 210 is rotated. Backlash is at its maximum $B_{max}$ when the width of each engagement structure 115 is at its minimum width $W_{min}$.

To minimize the backlash, the first half 111 and the second half 112 of the clutch plate 210 rotate in opposite directions when axial pressure $A_p$ is applied. The rotation of the first half 111 and the second half 112 in opposite directions decreases the thickness of the clutch plate 210, while widening the width of the engagement structures 115. The width of the engagement structure 115 will increase until the engagement structure 115 occupies the entire width of the groove 224 that the engagement structure 115 is disposed in, at which point the width of the engagement structure 115 has its maximum width $W_{max}$, shown in FIG. 3B, and the thickness of the clutch plate 210 has its minimum thickness $T_{min}$, shown in FIG. 4B. However, since $W_{max}$ is limited by the width of the groove 224, $T_{min}$ is likewise limited and may be larger than the minimum possible thickness of the clutch plate 210 if the engagement structure 115 was not in the groove 224. When the width of the engagement structure 115 is at its maximum width $W_{max}$, the backlash is at its minimum $B_{min}$ because the gap between the engagement structure 115 and the groove 224 has been effectively eliminated.

The clutch plates 210, 212 may also be used with the positionable joint 300 shown in FIGS. 6-9. The positionable joint 300 may include a first joint member 309 that is rotatable with respect to a second joint member 319. The first joint member 309 of positionable joint 300 can be defined by a first housing 310 and an end plate 312. The first housing 310 defines a hollow interior for receiving and containing components of the positionable joint 300. The hollow interior of the first housing 310 may be substantially cylindrical, either in whole or in part. The first housing 310 may include an integrally formed connector 314 for engaging another component.

The end plate 312 is a substantially planar circular member that is rigidly connected to an open end of the first housing 310 opposite the second joint member 319 by conventional fasteners, such as threaded fasteners that are operable to prevent rotation of the end plate 312 with respect to the first housing 310. This allows the end plate 312 to receive a rotational drive force at a drive aperture 313, which in this example is a non-round (e.g. hexagonal) aperture that is formed at a radial center of the end plate 312 and is positioned at and extends along an axis of rotation of the first joint member 309 with respect to the second joint member 319.

The second joint member 319 of positionable joint 300 can be defined by a second housing 320, an end plate 322, and a retainer ring 326. The second housing 320 defines a hollow interior for receiving and containing components of the positionable joint 300 as will be described further herein. In some implementations, the hollow interior of the second housing 320 is cylindrical or substantially cylindrical, either in whole or in part. The second housing 320 may include an integrally formed connector 324 for connection to modular tooling or other mechanical components.

The second housing 320 also includes an integrally formed engagement surface 325 that is positioned at and extends along the axis of rotation of the first joint member 309 with respect to the second joint member 319. The engagement surface 325 is formed on and can extend around the outer periphery of the second housing 320. In this example, engagement surface 325 defines a substantially polygonal periphery for the second housing 320, with the polygonal periphery being centered on the axis of rotation, such that a polygonal cross section for the second housing 320 is defined in the area of the engagement surface 325, when viewed in a direction that is substantially parallel to the axis of rotation. Other geometries can be utilized.

The end plate 322 is a substantially planar circular member that is rigidly connected to an open end of the second housing 320 opposite the first joint member 309 by conventional fasteners, such as threaded fasteners, that are operable to prevent rotation of the end plate 322 with respect to the second housing 320. An aperture 323 is formed through the end plate 322. In this example, the aperture 323 is positioned at and extends along the axis of rotation of the first joint member 309 with respect to the second joint member 319.

The retainer ring 326 is rigidly connected to the second housing 320 by conventional fasteners. The retainer ring 326 is configured with respect to the second housing 320 to define an annular channel in which part of the first housing 310 is received. This connection is configured such that the first housing 310 and the second housing 320 are rotatable with respect to one another but cannot be separated or moved axially by a significant distance while the retainer ring 326 is connected to the second housing 320.

To drive rotation of the first joint member 309 with respect to the second joint member 319, the positionable joint 300 includes a motor 330. The motor 330 includes a motor housing 332 and an output shaft 334. The motor 330 is operable to receive an input signal and rotate the output shaft 334 by a desired degree of rotation in response to the input signal. In another implementation, the motor 330 can be an electrical motor that does not include gear reduction, and a gear train can be provided separately, such as inside the second housing 320.

The motor housing 332 is fixedly connected to the second joint member 319 in a manner that prevents relative rotation of the motor housing 332 with respect to the second joint member 319. For example, the motor housing 332 can be rigidly connected to the end plate 322 with threaded fasteners or other conventional fasteners. The output shaft 334 extends through the aperture 323 of the end plate 322. A hub 336 is connected to the output shaft 334. In this implementation, the hub has an inner bore for receiving the output shaft 334, which is retained by conventional means, such as a hex screw, that is threaded to the hub along a passage substantially perpendicular to the inner bore to allow engagement and disengagement with the output shaft 334 in response to threaded advancement and retraction of the hex screw. The outer periphery of the hub 336 includes features that are intended to allow engagement of the hub to drive rotation of another structure, which in the implementation are substantially flat surfaces as part of a substantially polygonal (e.g. hexagonal) periphery.

The output shaft 334 of the motor is connected to a drive member 340 via a clutch assembly 350. The drive member 340 is disposed in the second housing 320 and a bearing 341. The clutch assembly 350 is a non-actuated clutch that serves to limit the amount of torque that can be transmitted from the drive member 340 to the motor. For example, the clutch assembly 350 can be configured to slip (and thus not transmit rotation) when the torque applied to the clutch assembly 350 meets or exceeds a predetermined amount of torque. This can prevent damage to the motor 330 as a result of external forces applied.

The clutch assembly 350 is housed within a cylindrical portion 342 of the drive member 340. The cylindrical portion 342 is in the form of a cylindrical wall that includes geometric features that are adapted to engage the clutch assembly 350 so that the drive member 340 can be driven by the clutch assembly 350. In the illustrated example, the drive member 340 has a plurality of axially extending slots 343 that extend from an open end of the cylindrical portion 342 to a closed end part way down the cylindrical wall. Portions of the clutch assembly 350 are received in the axially extending slots 343, as will be explained.

The clutch assembly 350 includes a biasing element 352, a plurality of first clutch plates 356, and a plurality of second clutch plates 354. The plurality of first clutch plates 356 are substantially similar to the plurality of first clutch plates 210, and the plurality of second clutch plates 354 are substantially similar to the plurality of second clutch plates 212. The plurality of first clutch plates 356 and the plurality of second clutch plates 354 are stacked in an interleaved manner. The biasing element 352 is positioned between the first and second clutch plates 354, 356 and the end plate 322 in order to apply pressure to the first and second clutch plates 354, 356, thereby increasing frictional engagement between the first and second clutch plates 354, 356. Each of the second clutch plates 354 has a drive aperture 355 that is adapted to engage the hub 336. As a result of engagement of the hub 336 with the drive apertures 355, the second clutch plates 354 rotate in unison with the output shaft 334 of the motor 330. Each of the first clutch plates 356 has a plurality of engagement structures 357, such as fingers or teeth, that extend into the axially extending slots 343 of the drive member 340. As a result of engagement of the engagement structures 357 with the axially extending slots 343, the first clutch plates 356 rotate in unison with the drive member 340.

The torque applied to the first and second clutch plates 354, 356 by the motor 330 is, under normal and expected operating conditions, below the threshold torque value that the clutch assembly 350 is intended to accommodate, and thus, rotation of the output shaft 334 of the motor 330 will cause rotation of the drive member 340 via the clutch assembly 350. If, however, torque is applied to the clutch assembly 350 by the drive member 340, the clutch assembly 350 will slip if the torque applied to the first and second clutch plates 354, 356 by the drive member 340 exceeds a predetermined value to prevent rotation of the output shaft 334 of the motor 330. The predetermined value is a function of the sizes and materials selected for the first and second clutch plates 354, 356, as well as the amount of force applied to the first and second clutch plates 354, 356 by the biasing element 352, and is set based on characteristics of the motor 330.

The drive member 340 includes a drive shaft 344 that extends into the first housing 310. At an end of the drive shaft 344, an engaging structure 345 is defined on the outer periphery of the drive shaft 344. In this example, the engaging structure 345 has a geometric configuration that is complementary to the geometric configuration of the drive aperture 313, and the engaging structure 345 is disposed in the drive aperture 313 such that motion of the end plate 312 and the first housing 310 with respect to the drive member 340 is restrained.

A releasable clutch assembly 360 is disposed within the first housing 310. The releasable clutch assembly 360 is movable between an engaged position, in which the releasable clutch assembly 360 restrains rotation of the first joint member 309 with respect to the second joint member 319, and a disengaged position, in which the releasable clutch assembly 360 permits rotation of the first joint member 309 with respect to the second joint member 319. The releasable clutch assembly 360 is actuatable to cause movement of the releasable clutch assembly 360 between the engaged position and the disengaged position. For example, the releasable clutch assembly 360 can be a pneumatically operated clutch that is actuatable by a supply of pressurized air, with the releasable clutch assembly 360 being biased toward the engaged position and movable to the disengaged position in response to the supply of pressurized air.

The releasable clutch assembly 360 includes a back plate 362, a biasing element 364 such as a wave spring, a pressure plate 366 with a collar portion 367, a plurality of first clutch plates 370, and a plurality of second clutch plates 368. The plurality of first clutch plates 370 are substantially similar to the first clutch plates 210, and the plurality of second clutch plates 368 are substantially similar to the second clutch plates 212. The back plate 362 is a circular member that is seated on the drive shaft 344. The pressure plate 366 is also seated on the drive shaft 344, with the biasing element 364 positioned between the back plate 362 and the pressure plate 366 to bias the pressure plate toward the first and second clutch plates 368, 370 to cause frictional engagement of the plurality of first clutch plates 370 with respect to the plurality of second clutch plates 368. An inner periphery of each of the second clutch plates 368 may include engagement structures 369, such as fingers or teeth, that are received on the engagement surface 325 of the second housing 320 such that relative rotation of the second housing 320 and the second clutch plates 368 is restrained. Engagement structures 371, such as fingers or teeth, on the first clutch plates 370 and grooves 311 on an inner periphery of the first housing 310 engage each other to prevent relative rotation of the first housing 310 and the first clutch plates 370. With the releasable clutch assembly 360 in the engaged position by virtue of the biasing element compressing the first and second clutch plates 368, 370 to provide frictional engagement of the first and second clutch plates 368, 370, the second housing 320 is restrained from rotating with respect to the first housing 310 unless subjected to an external force that overcomes the engagement of the first and second clutch plates 368, 370.

The releasable clutch assembly 360 remains in the engaged position while the positionable joint 300 is locked into position. Prior to adjustment of the angular position of the second joint member 319 with respect to the first joint member 309, the releasable clutch assembly 360 is moved to the disengaged position. The releasable clutch assembly 360 is moved to the disengaged position by releasing the pressure applied to the first and second clutch plates 368, 370 by the pressure plate 366. In the illustrated example, the collar portion 367 is disposed in a chamber 372 that is defined between the second housing 320 and the drive shaft 344. In order to disengage the releasable clutch assembly 360, a supply of pressurized air is introduced to the chamber 372, such as via a supply port 373 that is connected to an external source of pressurized air. Air pressure in the chamber 372 moves the pressure plate toward the back plate 362 against the force of the biasing element 364. This releases the frictional engagement of the first and second clutch plates 368, 370 so that the first clutch plates 370 can rotate relative to the second clutch plates 368 as the motor 330 drives adjustment of the second joint member 319 with respect to the first joint member 309. Once the positionable joint 300 has reached a desired angular configuration, the releasable clutch assembly 360 is moved to the engaged position by ending the supply of pressurized air to the chamber 372, thereby fixing the position of the first joint member 309 with respect to the second joint member 319.

In order to determine the position of the first housing 310 relative to the second housing 320, the positionable joint 300 includes an absolute encoder 380. The absolute encoder 380 is a device that directly senses the position of one structure with respect to another, without using relative measuring techniques, such as calibrating to a datum and then measuring motion with respect to the datum. Thus, the position can be sensed by a motion controller (not shown) in order to drive operation of the motor 330 to set a desired angular orientation of the first joint member 309 with respect to the second joint member 319. In the illustrated example, the absolute encoder is a flexible potentiometer, such as the FlexiPot Ring manufactured by Tekscan, Inc. of Boston, Mass. USA. Other types of motors and control strategies can be usable to provide a motor that is operable to drive a desired degree of rotation of the first joint member 309 with respect to the second joint member 319.

The clutch plates 210, 212 may also be used with the positionable joint 400 shown in FIGS. 10-13. The positionable joint 400 includes a first joint member 409 that is rotatable with respect to a second joint member 419. The positionable joint 400 is similar to the positionable joint 300 and the description made with respect to the positionable joint 300 applies to the positionable joint 400 except as noted.

The first joint member 409 of the positionable joint 400 includes a first housing 410 with an end plate 412 and an integrally formed connector 414. The second joint member 419 of the positionable joint 400 includes a second housing 420 with an end plate 422 and an integrally formed connector 424. A motor 430 having a motor housing 432 and a drive shaft 434 is connectable to the positionable joint 400 via the end plate 422. The drive shaft 434 drives a gear train 448 via a pinion gear 436. The gear train 448 reduces the speed and increases the torque of the rotational force provided by the motor 430. The gear train 448 causes rotation of a gear carrier 446. In the illustrated example, the gear train 448 is a planetary gear train. Other types of gear trains can be used. Alternatively, the gear train 448 can be omitted in favor of using a motor with internal gear reduction, as described with respect to the motor 330.

A drive member 440 and clutch assembly 450 are as described with respect to the drive member 340 and clutch assembly 350, with the clutch assembly 450 conducting torque below a predetermined level between the motor and the drive member 440. The clutch assembly includes a biasing element 452 and clutch plates 454, 456. The clutch plates 454, 456 are similar to the clutch plates 210, 212. The clutch assembly 450 receives rotational force from the motor 430 via the gear carrier 446, which rotates in unison with the clutch assembly 450 and drive member 440 below the predetermined torque level. A retainer ring 447 retains the clutch assembly 450 on the gear carrier 446 such that the clutch assembly 450 is captured between the gear carrier 446 and the retainer ring 447 to compress the disks of the clutch assembly 450. A bearing 441 facilitates rotation of the drive member 440 with respect to the second housing 420. A drive shaft 444 extends through the first housing 410 and is secured thereto by a fastener 445. An internal air passage in the drive shaft 444 supplies pressurized air to the first joint member 409 through a port 473. A bearing 466 facilitates rotation of the first housing 410 with respect to the second housing 420.

A releasable clutch assembly 460 is movable between an engaged position and a disengaged position such that the releasable clutch assembly 460 functions in the same manner as the releasable clutch assembly 360 of FIGS. 6-9 but with a different structural configuration. The releasable clutch assembly 460 includes a collar 462 that is seated on a shaft portion of the drive member 440. The collar 462 includes a wedge surface 464. A plurality of J-shaped levers 465 are pivotally connected to the second housing 420 by pins. Each J-shaped lever 465 has a first end engaged with the collar 462 and a second end that applies pressure to the first and second clutch plates 468, 470 to restrain rotation of the first joint member 409 with respect to the second joint member 419 when engaged. The plurality of first clutch plates 470 are substantially similar to the plurality of first clutch plates 210, and the plurality of second clutch plates 468 are substantially similar to the plurality of second clutch plates 212. Air pressure in the second housing 420 from the port 473 forces the collar 462 downward to pivot the J-shaped levers 465 into engagement with the first and second clutch plates 468, 470, placing the releasable clutch assembly 460 in the engaged position. In response to release of air pressure inside the second housing 420, the collar 462 slides upward, so that the wedge surface 464 no longer impedes pivoting of the J-shaped levers 465. The J-shaped levers 465 then pivot to release pressure on the first and second clutch plates 468, 470, which places the releasable clutch assembly 460 in the released position, with relative rotation of the first joint member 409 and the second joint member 419 no longer being restrained.

The positionable joint 400 includes an absolute encoder 480 positioned between the end plate 412 and the second housing 420. The absolute encoder 480 functions in the same manner as the absolute encoder 380.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An assembly comprising:
a first member;
a second member maintained in a spaced apart relationship from the first member along an axis; and
a clutch plate disposed between the first member and second member, the clutch plate having a plurality of engagement structures spaced circumferentially from each other and extending radially from the clutch plate in perpendicular relation to the axis, the clutch plate including a first half and a second half that are slidably rotatable with respect to one another,
wherein the engagement structures included on the first half of the clutch plate and the second half of the clutch plate include corresponding mating surfaces extending towards each other such that the corresponding mating surfaces are in direct contact, the first half and the second half of the clutch plate rotating in opposite directions to widen a width of each radially extending engagement structure via the contact between the mating surfaces when axial pressure is applied to the first member.

2. An assembly comprising:
a first member;
a second member maintained in a spaced apart relationship from the first member; and
a clutch plate having radially extending engagement structures and disposed between the first member and second member, the clutch plate having a first half and a second half that are slidably rotatable with respect to one another,
wherein the first half and second half of the clutch plate rotate in opposite directions to widen a width of each radially extending engagement structure when axial pressure is applied to the first member, the assembly further comprising:
a housing having a substantially cylindrical wall with grooves formed therein, wherein the radially extending engagement structures of the clutch plate are disposed within the grooves of the substantially cylindrical wall.

3. The assembly of claim 2, wherein the width of each radially extending engagement structure of the clutch plate when no axial pressure is applied is less than a width of the respective groove in the substantially cylindrical wall that the radially extending engagement structure is disposed in.

4. An assembly comprising:
a first member;
a second member maintained in a spaced apart relationship from the first member; and
a clutch plate having radially extending engagement structures and disposed between the first member and second member, the clutch plate having a first half and a second half that are slidably rotatable with respect to one another,
wherein the first half and second half of the clutch plate rotate in opposite directions to widen a width of each radially extending engagement structure when axial pressure is applied to the first member, the assembly further comprising:
a housing having a shaft with grooves formed thereon, wherein the radially extending engagement structures of the clutch plate are disposed within the grooves of the shaft.

5. The assembly of claim 4, wherein the width of each radially extending engagement structure of the clutch plate when no axial pressure is applied is less than a width of the respective groove in the shaft for which the radially extending engagement structure is disposed in.

6. The assembly of claim 1, wherein the corresponding mating surfaces have inclined portions and protrude along the axis.

7. The assembly of claim 6, wherein the inclined portions each have a substantially triangular cross-sectional configuration.

8. The assembly of claim 7, wherein two legs of each inclined portion form a right angle with an opposing hypotenuse.

9. The assembly of claim 8, wherein the inclined portions of the first half of the clutch plate are oriented so that the right angle of each inclined portion is on a first side of each respective inclined portion.

10. The assembly of claim 9, wherein the inclined portions of the second half of the clutch plate are oriented so that the right angle of each inclined surface is on a second side of each respective inclined surface.

11. The assembly of claim 8, wherein the hypotenuse of each inclined portion of the first half of the clutch plate engages the hypotenuse of a corresponding inclined portion of the second half of the clutch plate.

12. The assembly of claim 6, wherein the inclined portions of the first half and the second half of the clutch plate are substantially similar.

13. The assembly of claim 6, wherein the inclined portions of the first half of the clutch plate have a positive slope and the inclined portions of the second half of the clutch plate have a negative slope.

14. The assembly of claim 1, wherein the clutch plate has a substantially disc-like configuration with a substantially cylindrical aperture extending in an axial direction, wherein a thickness of the clutch plate is measured in the axial direction, and the thickness of the clutch plate decreases as axial pressure applied to the first member increases until the thickness of the clutch plate reaches a minimum thickness.

15. An assembly comprising:
a first member;
a second member maintained in a spaced apart relationship from the first member; and
a clutch plate having radially extending engagement structures and disposed between the first member and second member, the clutch plate having a first half and a second half that are slidably rotatable with respect to one another,
wherein the first half and second half of the clutch plate rotate in opposite directions to widen a width of each radially extending engagement structure when axial pressure is applied to the first member, the assembly further comprising:
a housing having a substantially cylindrical wall with grooves formed therein and a shaft with grooves formed therein; and
a second clutch plate having radially extending engagement structures and disposed between the first member and the second member, the second clutch plate having a first half and a second half that are slidably rotatable with respect to one another, wherein the first half and second half of the second clutch plate rotate in opposite directions to widen a width of each radially extending engagement structure when axial pressure is applied to the first member,
wherein the radially extending engagement structures of the clutch plate are disposed within the grooves of the substantially cylindrical wall and the radially extending engagement structures of the second clutch plate are disposed within the grooves of the shaft.

16. The assembly of claim 15, wherein the second member comprises an end plate connected to the substantially cylindrical wall.

17. The assembly of claim 15, wherein the engagement structures have inclined portions and protrude axially.

18. The assembly of claim 17, wherein the inclined portions each have a substantially triangular cross-sectional configuration, wherein two legs of each inclined portion form a right angle with an opposing hypotenuse, wherein the inclined portions of the first half of the clutch plate are oriented so that the right angle is on a first side thereof and the inclined portions of the second half of the clutch plate are oriented so that the right angle is on a second side thereof, and wherein the hypotenuse of each inclined portion of the first half of the clutch plate engages the hypotenuse of a corresponding inclined portion of the second half of the clutch plate.

19. The assembly of claim 15, wherein the inclined portions each have a substantially triangular cross-sectional configuration, wherein two legs of each inclined portion form a right angle with an opposing hypotenuse, wherein the inclined portions of the first half of the second clutch plate are oriented so that the right angle is on a first side thereof and the inclined portions of the second half of the second clutch plate are oriented so that the right angle is on a second side thereof, and wherein the hypotenuse of each inclined portion of the first half of the second clutch plate engages the hypotenuse of a respective inclined portion of the second half of the second clutch plate.

20. The assembly of claim 17, wherein one of either the inclined portions of the first half of the clutch plate or the inclined portions of the second half of the clutch plate have a positive slope and the other of the inclined portions of the first half of the clutch plate or the inclined portions of the second half of the clutch plate have a negative slope, and wherein one of either the inclined portions of the first half of the second clutch plate or the inclined portions of the second half of the second clutch plate have a positive slope and the other of the inclined portions of the first half of the second clutch plate or the inclined portions of the second half of the second clutch plate have a negative slope.

* * * * *